United States Patent [19]
Anderson

[11] 3,858,034
[45] Dec. 31, 1974

[54] ELECTROCARDIAC COMPUTER
[75] Inventor: Donald L. Anderson, Huntington Beach, Calif.
[73] Assignee: Del Mar Engineering Laboratories, Los Angeles, Calif.
[22] Filed: Oct. 19, 1973
[21] Appl. No.: 407,794

[52] U.S. Cl. ................. 235/151.3, 128/2.06 A
[51] Int. Cl. .................... A61b 5/04, G06g 7/48
[58] Field of Search ............. 235/151.3, 151, 193; 444/1; 128/2.06 R, 2.06 A, 2.06 E

[56] References Cited
UNITED STATES PATENTS
3,267,933   8/1966   Mills et al. ................. 128/2.06 A
3,460,527   8/1969   Karsh ........................ 128/2.06 A
3,524,442   8/1970   Horth ........................ 128/2.06 A
3,554,187   1/1971   Glassner et al. ........... 128/2.06 A
3,598,110   8/1971   Edmark ...................... 128/2.06 A Primary Examiner—Joseph F. Ruggiero
Attorney, Agent, or Firm—George F. Smyth

[57] ABSTRACT

An electrocardiac computer for determining and displaying the existence of certain abnormalities in ECG complexes. The ECG signal input is processed electronically to recognize and indicate the occurrence of excessively wide Q-R-S events within the ECG complexes and to total the number of such occurrences during a period of time, and to determine and subsequently display the level of elevation or depression, slope, shape and integral of the S-T segment portion of each ECG complex containing a normal QRS event.

32 Claims, 14 Drawing Figures

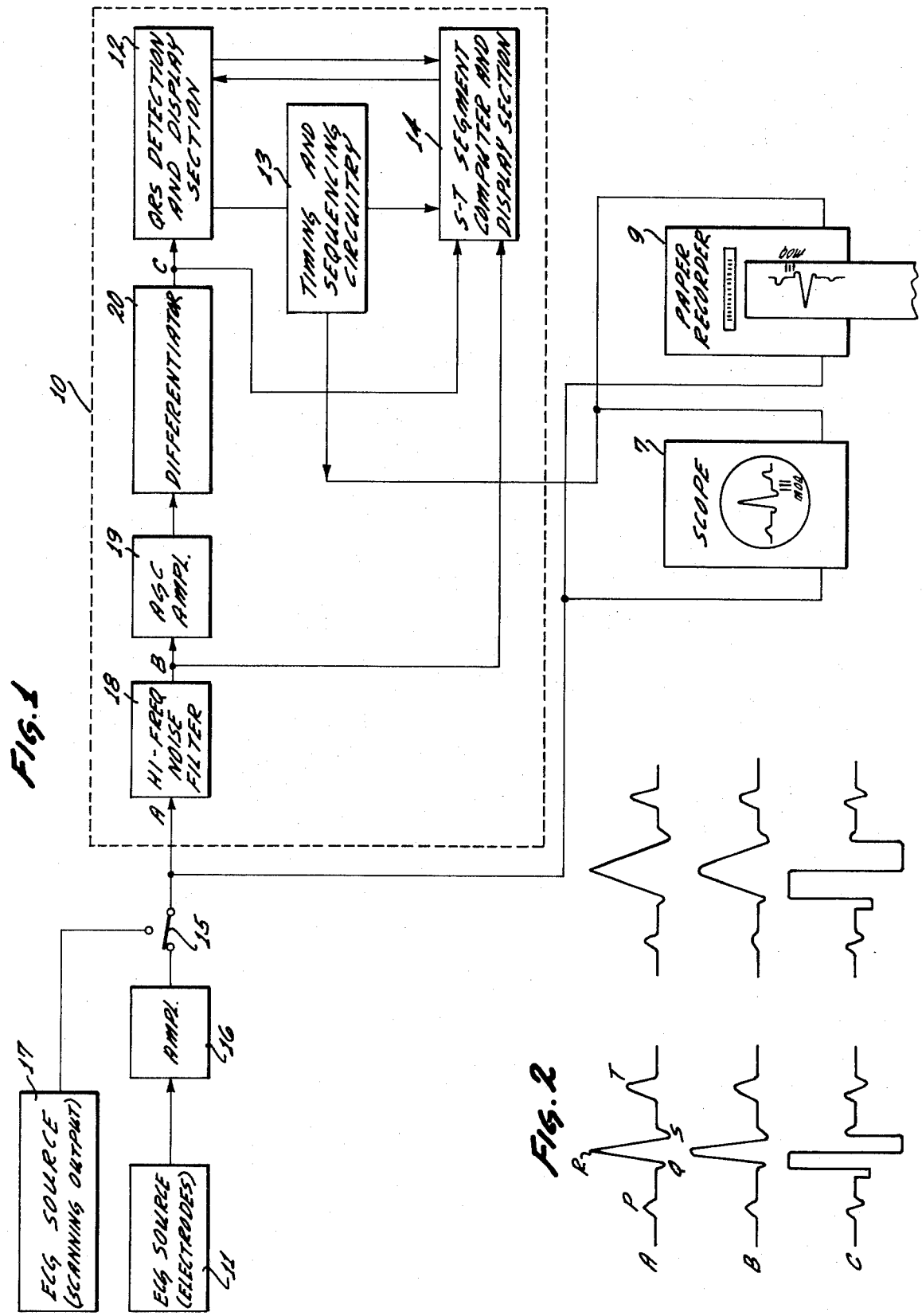

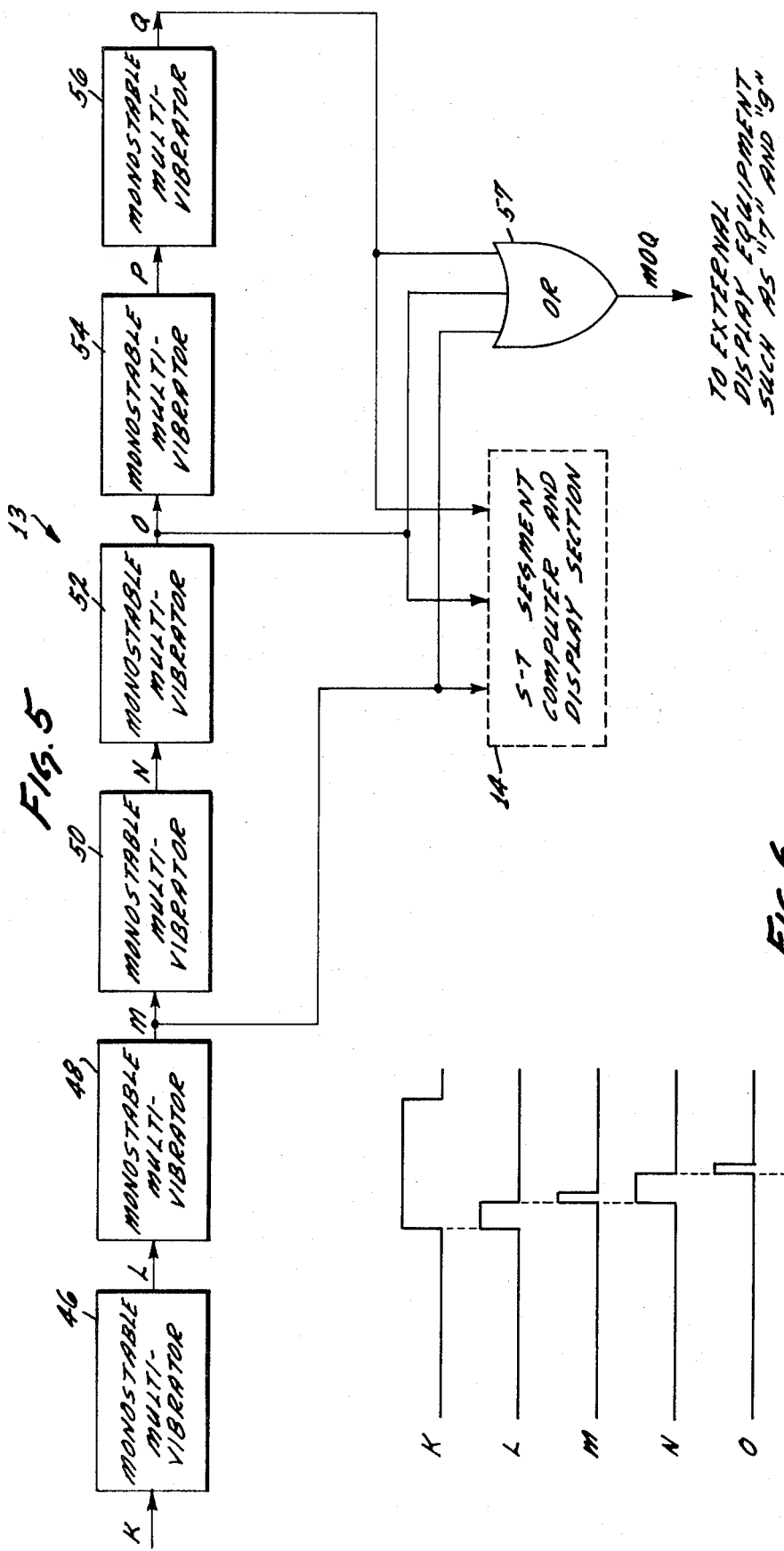

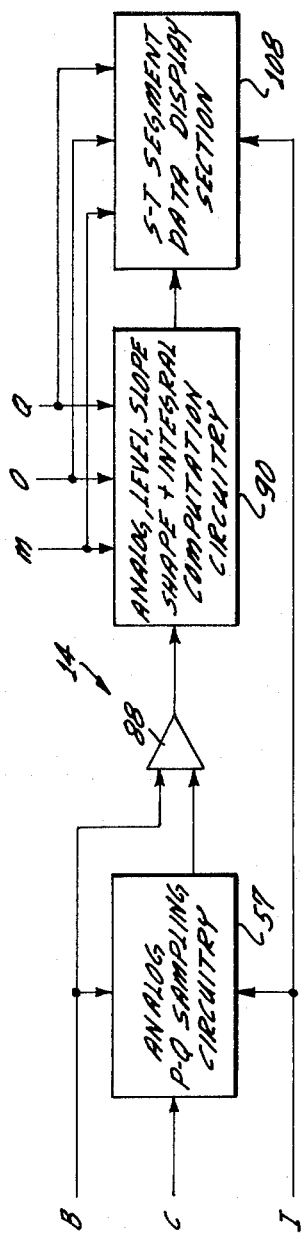
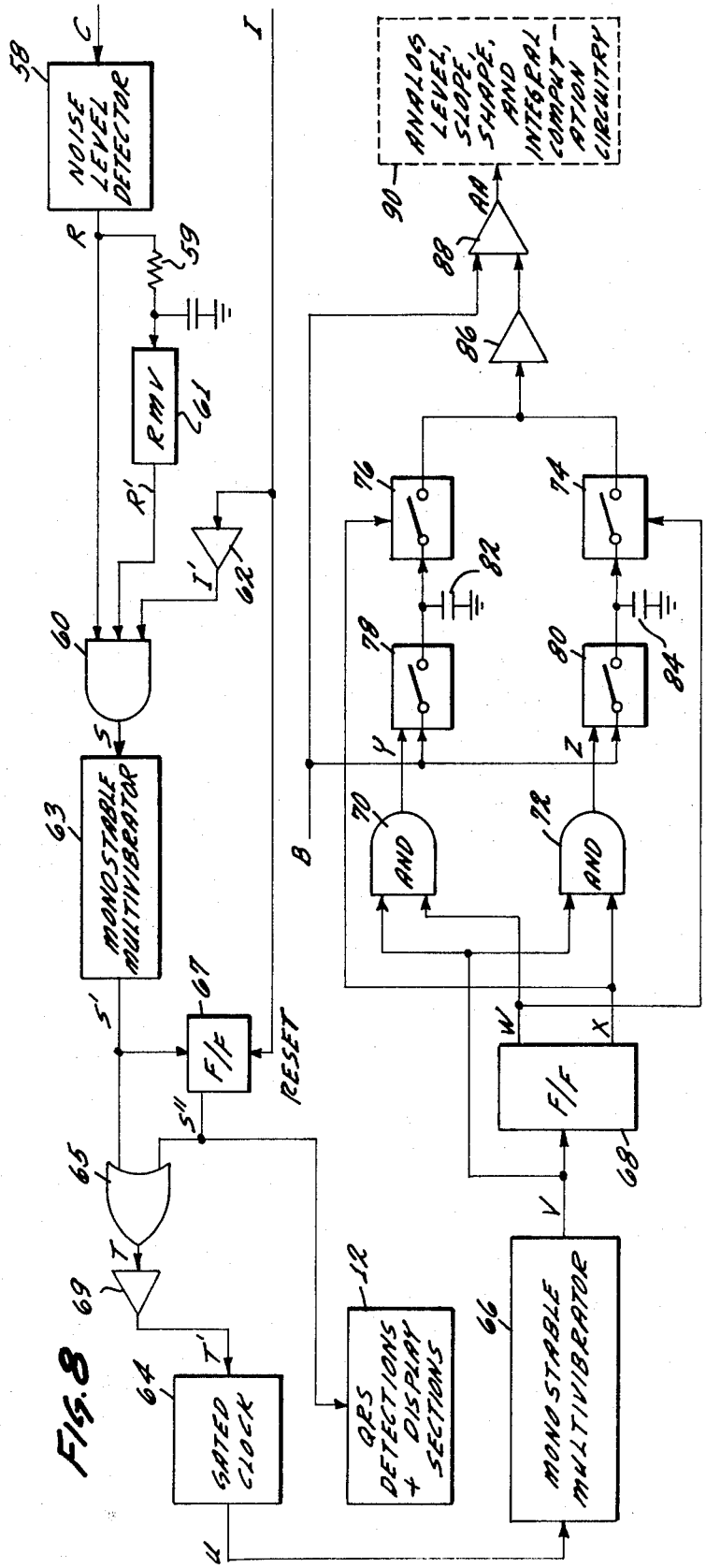
FIG. 7
FIG. 8

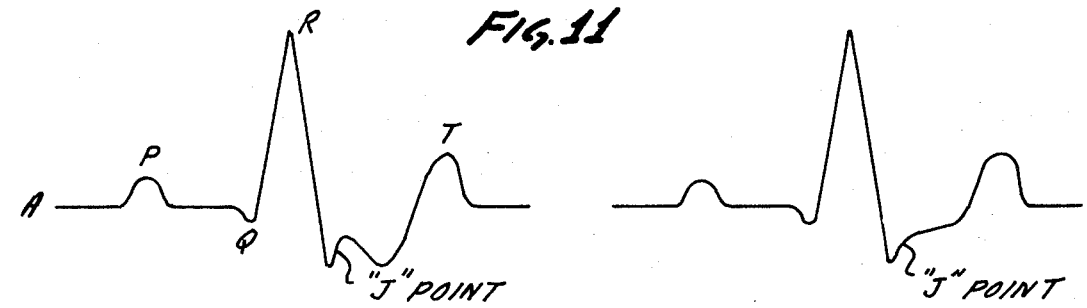
Fig. 11
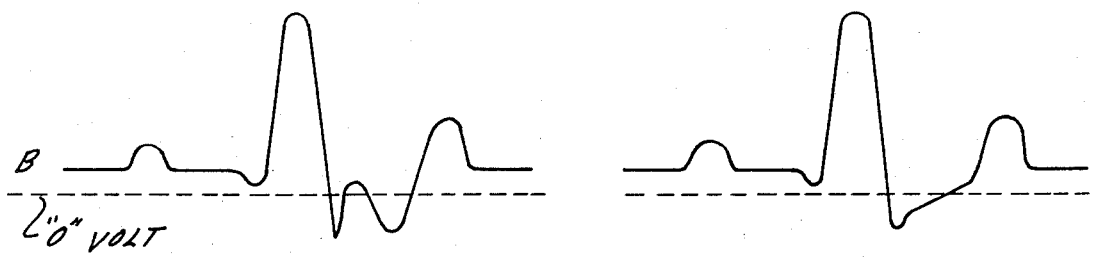
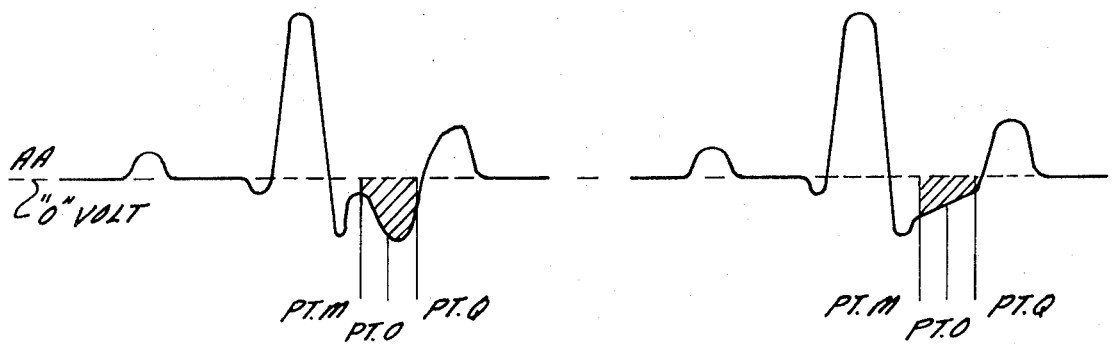
Fig. 14
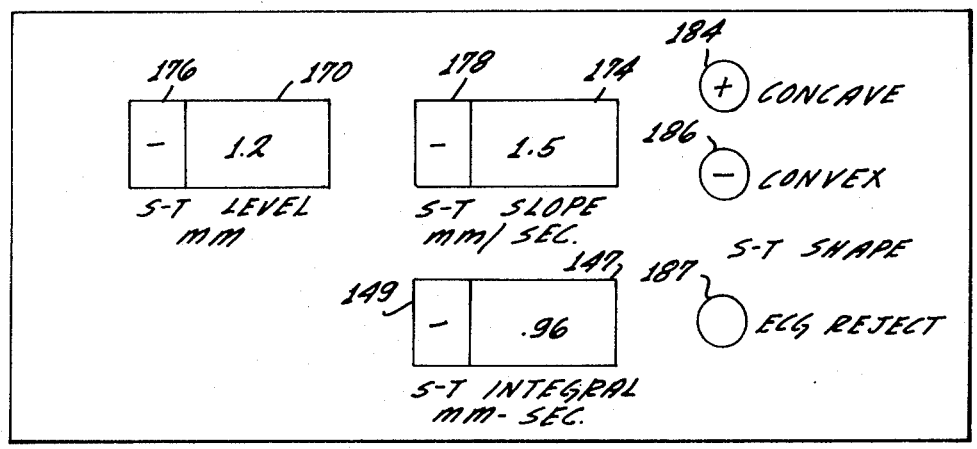

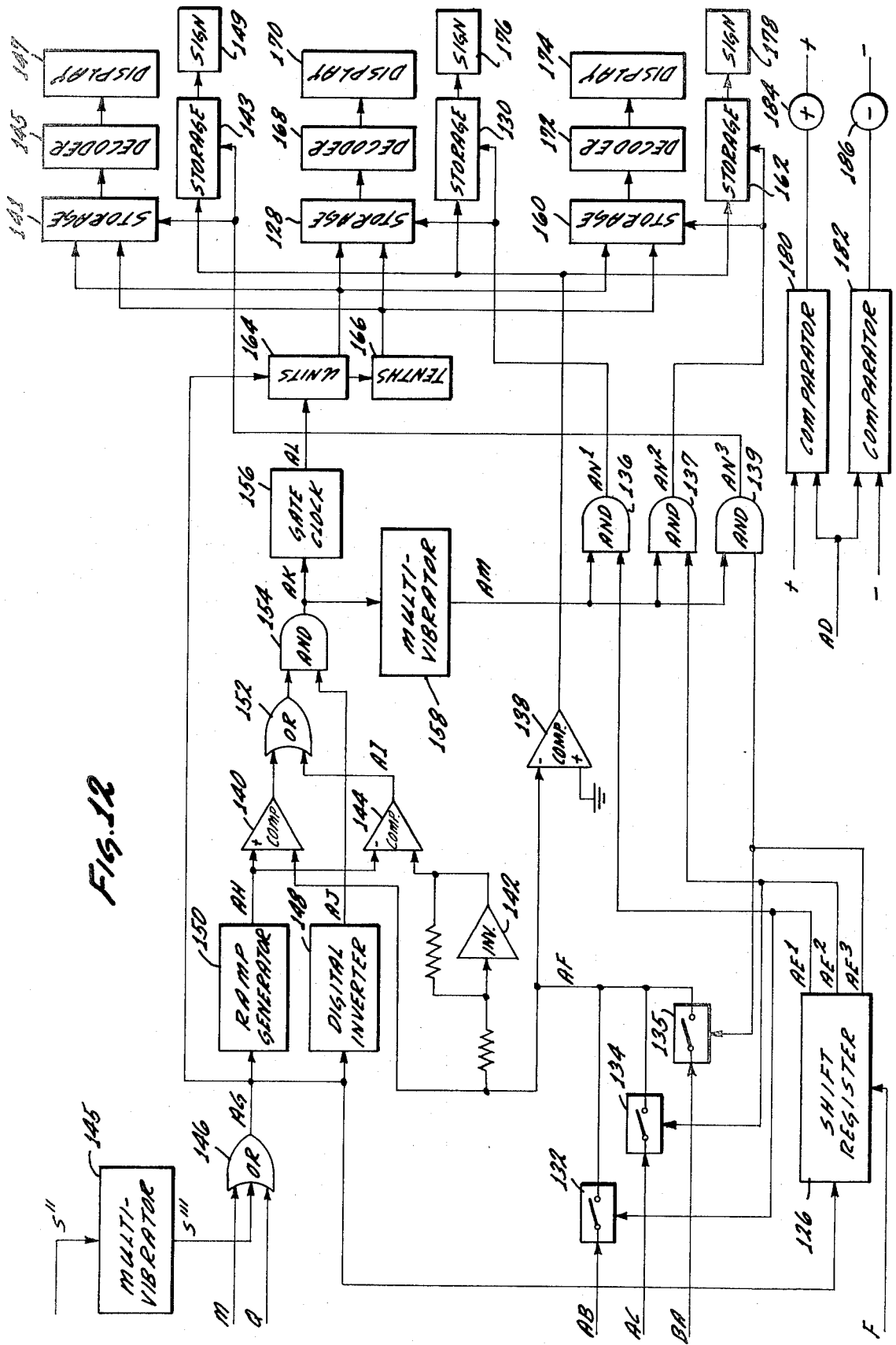

ELECTROCARDIAC COMPUTER

The present invention relates to a means for automatically processing large quantities of ECG signals either directly from a patient in real time, or indirectly via a data storage medium in either real time or using high speed scanning devices. The present invention provides a means for detection and display of occurrences of abnormally wide QRS complexes, as well as the detection and display of level, slope, shape and integral of the S-T segments in the ECG signals containing normal QRS complexes.

The ECG signals resulting from the electrical activity of the cardiac muscle are extremely valuable diagnostic indicators when viewed by a cardiologist. Certain abnormalities in these ECG signals can be indicative of different types of heart disorders. These ECG signals, when sensed by electrodes placed on the patient's body may be transmitted through leads to an appropriate device such as as oscilloscope of an electrocardiograph, to be either momentarily presented or permanently recorded.

In the past, the ECG signals have been fed into a conventional computer programmed to analyze the incoming signals for abnormalities, but such analysis has generally been on a limited experimental bases. One reason such computer analysis has been limited is the large initial cost of a computer large enough to perform the functions as well as high cost of operation since the computer must be on-line the entire time ECG signals are being analyzed. These costs, combined with a further requirement of highly specialized technical personnel to conduct the program, make this computer process economically unfeasible for most "on-line" applications.

At the present time, the most common and practical means for determining abnormalities of the heart is to input the ECG signals into an electrocardiograph and to manually study and analyze the resultant paper-tape graph of the ECG signals. Sufficient data must be recorded to reasonably assure an accurate presentation of the ECG signal's characteristics under various activity conditions, so that the analysis of the ECG study is a time-consuming process, requiring the services of a highly skilled cardiologist for long periods of time.

The normal process of analyzing ECG signals is even more undesirable when it is realized that some forms of disorders produce abnormal ECG signals at only random and infrequent intervals so that a large accumulation of data may be required before any abnormality is recorded. Even after the abnormality is recorded, it is difficult, if not impossible, for the cardiologist to manually examine the large volume of data and to accurately identify the random and infrequent abnormalities which are of a transient and dynamic nature.

The results of some of the prior work in the field of electrocardiac computer design is disclosed in U.S. Pat. No. 3,267,934 issued Aug. 23, 1966. The invention described in U.S. Pat. No. 3,267,934 provides a device for obtaining large quantities of electrocardiac signals and automatically processing the electrocardiac signals to indicate the presence and character of certain forms of abnormalities. Although the invention described in U.S. Pat. No. 3,267,934 is of great value, the type and quantity of data processed is limited and is less than desired for a detailed analysis of the ECG complexes, such as the S-T segment portion.

It is a purpose of the present invention to provide a novel computer suitable for automatically processing large quantities of ECG signals, detecting certain preselected characteristics or abnormalities therein indicative of certain types of cardiac disorder or insufficiency and therefore of interest to a cardiologist, and indicating the occurrence of such abnormalities. The device of the present invention avoids the economic disadvantage of utilizing a conventional computer programmed to process the ECG signals as well as the manual analysis of electrocardiograms. The present invention has an expanded capability for the identification and indication of abnormalities beyond that of the previous U.S. Pat. No. 3,267,934. Inherent in the present invention is a system for evaluating the quality of the data being measured and improving the accuracy of the indications by rejecting to a large extent artifacts caused by sources such as electrode or patient cable shock movement, muscle tension, etc.

Specifically, the present invention provides means for recognizing and indicating abnormally wide Q-R-S complexes within the ECG signals by measuring the time duration of the R-wave. Also, the present invention provides means for determining the number of abnormally wide Q-R-S events occurring within a given length of time and to provide such output signals to remote locations such as an automatic ECG recorder, a computer interface, an aural alarm, etc.

Further, the present invention provides means for determining and subsequently displaying the level of either an elevation or depression of the S-T segment portion with respect to the preceeding p-q "iso-electric" portion of each cardiac ECG complex by comparing the difference between the electric potential of two portions of the ECG signals. The present invention also provides means for determining whether the preceeding p-q "iso-electric" portion is of acceptable quality and if it is not, the comparison is not made.

The present invention also provides means for determining and subsequently displaying the rate of change, or slope, of the S-T segment portion of each ECG complex by comparing the difference between the electric potential of two samples taken in each S-T segment. In addition, the present invention provides means for determining and subsequently displaying the shape of the S-T segment portion of each ECG complex by comparing the electric potential of three samples taken in each S-T segment.

The present invention will also compute the voltage x time product or time integral, of S-T level for display and subsequent analysis by comparing the difference in the electric potential of the "iso-electric" p-q portion of each ECG complex with respect to a relatively long term sample (e.g. 0.1–0.2 sec.) within the S-T portion of the complex.

The various features and advantages of the present invention will become more readily apparent from the following detailed description of one form of the present invention, particularly when taken in connection with the accompanying drawings wherein:

FIG. 1 is a block diagram of an electrocardiographic system embodying one form of the present invention;

FIG. 2 is a series of wave forms present in various portions of the block diagram of FIG. 1 with two different types of ECG complexes;

FIG. 5 is a block diagram of the portion of the electrocardiographic system of FIG. 1 for establishing and providing timing and sequencing signals for sampling in the S-T segment of ECG complexes;

FIG. 6 is a series of waveforms present in various portions of the block diagram of FIG. 5;

FIG. 7 is a block diagram of the S-T segment computer and display section of the present invention;

FIG. 8 is a block diagram of the p-q sampling circuitry of the S-T segment computer and display section of the present invention;

FIG. 11 is a series of waveforms present in the functional diagram of FIG. 10;

FIG. 12 is a block diagram of the S-T segment data display section of the S-T segment computer and display section of the present invention;

FIG. 14 is a front view of the display panel of the control box housing the various computer sections of the invention.

Figure 3:
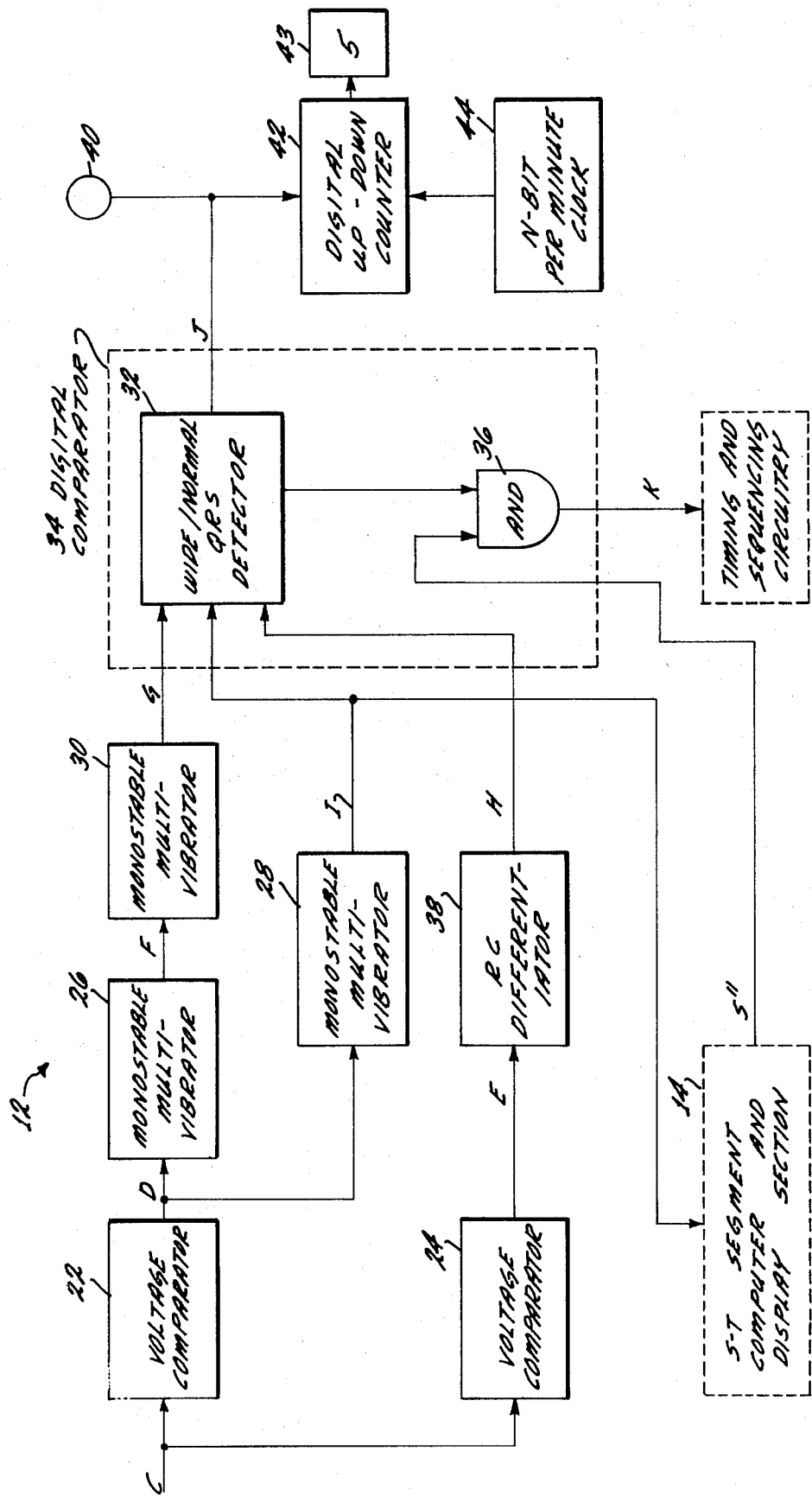
FIG. 3 is a block diagram of the portion of the electrocardiographic system of FIG. 1 for determining and indicating the presence of wide QRS complexes in the ECG signals.

Referring to FIG. 1, the present invention is embodied in an electrocardiographic system 10 having a QRS detection and display section 12, a S-T segment computer and display section 14 and timing and sequencing circuitry 13. The ECG signals may be introduced to the system by several suitable means. One such means, represented by block 11, is by direct connection to a pair of electrodes on the external surface of a person's chest in the standard lead positions. Another means, represented by block 17, is by connection to an appropriate output in a high speed playback system wherein tape recordings of ECG complexes previously recorded may be scanned in either real time or some multiple of real time. Although the various characteristics of the ECG signals obtained may vary throughout a wide range, a normal person will generally produce a waveform similar to the classical form shown in the left-hand portion of the first example A of FIG. 2. This classical waveform includes, in the following sequence, a P wave of positive polarity, a QRS complex consisting of a negative Q wave, a positive R wave and a negative S wave, and a T wave that is separated from the QRS complex by a so-called S-T segment. There may be several additional waves present in a normal ECG signal but since they have little effect on the operation of the present invention, the present description will be confined to waveforms of this general nature. It should be noted that the QRS complex has been widened on the time axis to permit clearer illustrations of the sequence of events.

The resting ECG signals typically occur periodically at a frequency on the order of about 60 to 80 beats per minute. However, under abnormal or stress circumstances, the cardiac rate may be very erratic and/or may rise to in excess of 200 beats per minute. The P wave is normally a small, positive pulse that corresponds to the initial impulse that controls the commencement of the heartbeat, which provides the resulting reflux expansions and contractions. Immediately following the P wave, there is a period of essentially quiescent electrical activity resulting in an ECG potential of substantially zero amplitude. Normally, this quiescent period has a time duration of the order of 0.04 seconds and may be used as an isoelectric signal to be employed as a reference against which the remaining portions or waves of the ECG signal are measured. The isoelectric signal is terminated by the start of the QRS complex. The QRS complex represents the stimulus which triggers the ventricular contraction which produces the actual cardiac pumping action. The QRS complex generally commences with a Q wave which is a small negative pulse. The Q wave is succeeded by the R wave, which is the most conspicuous portion of the ECG signal. The R wave normally comprises a positive pulse having an amplitude greater than any of the other waves present in the ECG signal. Normally, the R wave has the appearance of a "spike" with a sharp rise and fall and a relatively short duration. The maximum time duration for the R wave is normally on the order of up to 0.08 seconds. However, certain types of abnormalities may result in an ECG signal characterized by a distortion of the R wave or QRS complex and particularly may result in an increase in time duration of the R wave. Specifically, an abnormality, such as premature ventricular beats which result from an ectopic focus (or foci) of depolarization in the ventricle, may increase the time duration of the R wave. A normal R wave is as shown in the left-hand ECG signal in example A of FIG. 2 shows an ECG signal normal in most respects except for containing a wide R wave or QRS complex. Following the R wave the QRS complex terminates in an S wave. The S wave is similar to the Q wave in that it is usually a small negative pulse.

After the QRS complex, there is normally a T wave which is separated from the S wave by the S-T segment. The potential of the S-T segment is normally approximately equal to the potential of the isoelectric portion between the termination of the P wave and the commencement of the Q wave. However, some abnormalities, such as cardiac ischemia, cause the level of the S-T segment to be depressed or more negative than the isoelectric portion. Other forms of abnormalities, which are generally more severe, such as cardiac damage resulting from an acute myocardial infarction, can cause the S-T segment to be elevated.

The ECG complexes generated by the placement of electrodes on a person's chest, as represented by block 11, is passed through an amplifier 16 of conventional design to provide a uniform gain over an adequate bandwidth and to amplify all components in the ECG signal to a more useful level. The output signal from the amplifier 16 is a faithful reproduction of the ECG signal but of increased amplitude so as to be suitable as an input to the electrocardiac device 10. In the case where the output of a high speed playback system, utilizing magnetic tape recordings, or some similar means of data storage, as represented by block 17, is used as a source of the ECG complexes, suitable amplification of the ECG complex would normally be accomplished within the playback system. The time-dependent circuits of the computer are then re-scaled for the high speed analysis. A two-position switch 15 is used to select the desired source of ECG complexes, which may take the form shown in FIG. 2 in the two examples of line A. It is to be appreciated that the ECG complexes may be displayed on a visual indicator such as an oscilloscope 7 or a paper writer 9 and with a second timing input to the visual indicators from the timing and sequencing circuitry 13.

The input signal A is first passed through high frequency noise filter 18 to filter out artifacts or noises in the incoming ECG signal which may be introduced by electrode movement, muscle tension, etc. The filter 18 may be a 30 Hertz low pass active filter designed to attenuate high frequency noise while minimizing distortion to the ECG signal. The output signal B from the filter 18 is shown in the two examples on line B of FIG. 2, which correspond to the two examples of line A. The output signal from the filter 18 is coupled to the S-T segment computer and display section 14 and also coupled to an AGC amplifier 19. Amplifier 19 may be a conventional automatic gain control amplifier to provide normalization of the ECG complexes to obtain standardized QRS amplitudes. The gain range of amplifier 19 is set to cover a limited range to provide a nearly constant QRS output voltage. The AGC amplifier prevent extraneous noise from appearing as a QRS complex to thus improve QRS detection and to minimize timing errors. The response time of the AGC amplifier 19 provides a change in gain from one QRS level to another level in several seconds or QRS periods. The output signal of amplifier 19 has a waveform comparable to those shown on line B of FIG. 2 and this output signal is fed to differentiator 20. The output signal of differentiator 20 is directly proportional to the rate of change of the higher frequency components of the input signal and has a waveform as shown by the two examples in line C of FIG. 2. The left-hand example of line C of FIG. 2 corresponds to a normal ECG signal while the right hand example on line C of FIG. 2 is that of an ECG signal containing a wide R wave or QRS complex. The output signal "C" from differentiator 20 is coupled to the S-T segment computer and display section 14 and to the wide QRS detection and display section 12.

Figure 4:
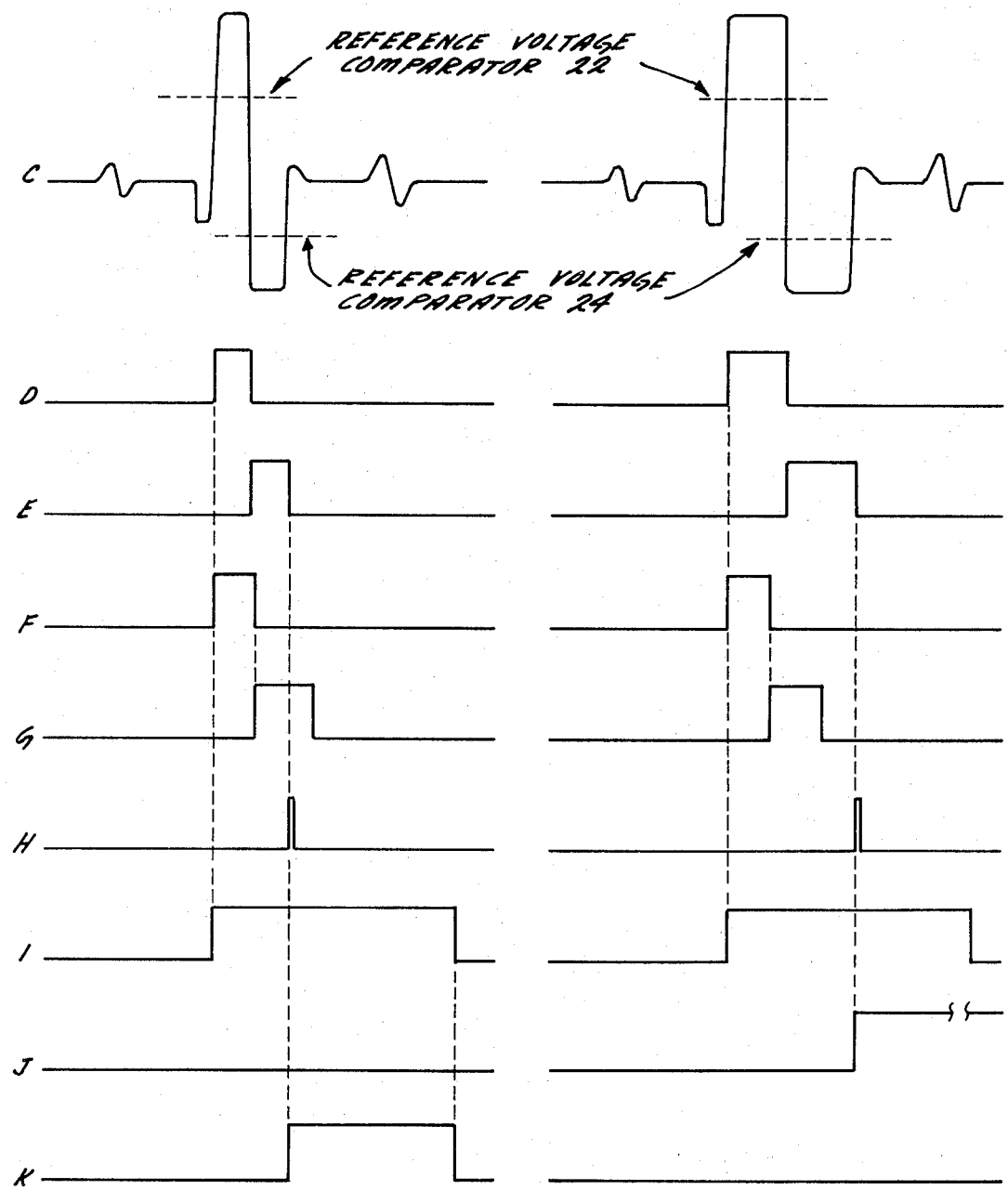
FIG. 4 is a series of waveforms present in various portions of the block diagram of FIG. 3 with two different types of ECG complexes.

The wide QRS detection and display section 12 determines the presence of certain abnormalities in the processed ECG signals. For example, the duration of the R wave or QRS complex is appreciably increased above the normal when the heart experiences premature ventricular contractions. Section 12 also includes circuitry for displaying the number of wide QRS complexes above a selected normal number occurring within a unit of time. The section 12 may also provide an output signal to a remote user. Another function of section 12 is to provide an output signal to the timing and sequencing circuitry 13 each time a normal R wave is present in the processed ECG signals. The section 12 also provides a computation enabling signal to the S-T segment computer and display section 14. FIG. 3 illustrates a block diagram of section 12 and FIG. 4 illustrates the waveforms present at various portions of FIG. 3. The input to section 12 is through a pair of voltage comparators 22 and 24. Each of the voltage comparators 22 and 24 is connected directly to the output of the differentiator 20 and the ECG signal supplied to each of the comparators may be similar to the left-hand example on lines C of FIGS. 2 or 4 for a normal ECG signal or to the right-hand example of lines C of FIGS. 2 or 4 for a wide QRS complex.

Voltage comparator 22 is a conventional design for comparing an input voltage level to a reference voltage level. The value of the reference voltage level is selected so that the differentiated positive polarity voltage generated by the leading edge of the R wave in the ECG signal exceeds the reference level. Other positive voltages generated by such as the P wave, T wave, etc., are less than the reference level. Likewise, voltage comparator 24 is a conventional voltage comparator having a reference voltage level selected so that the negative voltage generated by the trailing edge of the R wave in the ECG signal exceeds the reference level, but the other negative voltages such as generated by the Q wave do not exceed the reference level. The reference voltages for the comparators 22 and 24 are shown on line "C" of FIG. 4. The voltage comparator 22 initiates a positive pulse when the voltage level of the input signal exceeds the reference voltage and the duration of the pulse equals the time the input voltage remains above the reference voltage level. The output of voltage comparator 22 is a pulse, as shown on line D in FIG. 4 and this output is fed simultaneously to monostable multivibrators 26 and 28. The output level of the multivibrators 26 and 28 are responsive to the amplitude of their input signal. When the potential of the input signal rises above a predetermined level, the multivibrator changes state so that the potential on the output signal is high and remains so for a predetermined time interval. For example, the multivibrator 28 may produce an output pulse having a time duration on the order of 200 milliseconds. The output signal from multivibrator 26 is introduced into a monostable multivibrator 30 having a predetermined pulse duration of approximately 70 milliseconds, but responsive to the termination of the pulse signal from the multivibrator 26. The resultant output signal from the multivibrator 30 is shown on line G. This output is coupled directly into the wide/normal detector portion 32 of the digital comparator 34. The output signal from the multivibrator 28 is a pulse signal similar to that from multivibrator 26 but with a longer time duration such as shown in the examples on line I of FIG. 4. The pulse signal from multivibrator 28 is introduced to the S-T segment computer and display section 14 and is also coupled to the wide/normal detector 32.

The input signal shown on line C of FIG. 4 is also coupled to the voltage comparator 24. The voltage comparator 24 provides a positive pulse output signal when the voltage of the input signal is negative and of a greater magnitude than a predetermined reference voltage. The output signal from the voltage comparator continues as long as the input voltage magnitude is greater than the reference voltage level. Accordingly, the introduction of a signal such as shown in the examples on line C result in output signals as shown in the examples on line E of FIG. 4. The output signals are coupled to a RC differentiator 38 which comprises a resistor-capacitor network. The differentiator provides a logic pulse by the transition in the voltage potential at the trailing edge of the signal shown in line E of FIG. 4. The output from the differentiator 38 is shown on line H of FIG. 4 and is coupled to the wide/normal detector 32 of the digital comparator 34.

The wide/normal detector 34 includes parallel cross connected J-K flip flops. One of the flip flops changes state as the output signal J whenever a pulse in the H signal is received and a low state in the G signal is present. As shown in the right-hand example on line J, the J signal continues high until the state of the G signal is changed by the increase in potential associated with the subsequent pulse. Since the timing of the pulse in the H signal is coincidental to the conclusion of the R wave in the QRS complex, the delay of the pulse in the H signal past the duration of the pulse in the G signal occurs only when a wide QRS complex exists in the processed ECG signal.

When the ECG is normal, the G and H signals coupled to the digital comparator 34 are as shown in the left-hand example of lines G and H in FIG. 4. No pulse signal is generated from the J-K flip flop circuit, as shown in the left-hand example on line J, since the H pulse occurs during the high state of the G signal. Therefore, an output pulse from the digital comparator 34, as shown in the right-hand example on line J of FIG. 4, is indicative of the occurrence of a wide QRS complex in the processed ECG signals.

The output J signal is used to activate a visual or aural indicator 40 to provide a visual or aural indication of each wide QRS complex in the processed ECG signals and the J signal is also coupled to a conventional digital up-down counter 42. An additional input signal to the counter 42 is provided from a conventional N Bit per minute clock 44 which allows for the selection of a desired rate of the clock output. The J signal drives the counter 42 up and the clock signal from the clock 44 drives the counter down. The digital counter 42, therefore, provides an output signal indicative of a number of wide QRS complexes present in the ECG signals over a specified time period in excess of the selected normal as set into the clock 44. The outputs from the digital counter 42 may be used to remote ancillary equipment such as an aural alarm, an automatic ECG recorder, a computer, a printer, etc., and may be for example an output indicator 43 which directly indicates the number of wide QRS complexes in excess of a selected normal. The complementary output from he J-K flip flop circuit contained in the wide/normal detector 32 is coupled to an "AND" gate 36 and provides high output signal whenever a pulse in the H signal is received and a high state for the G signal is present. The I signal from the multivibrator 28 is set into the J-K flip flop to bias the flip flop so that the high output signal will continue so long as the I signal has a high potential. In the case of an ECG signal containing a wide QRS complex, the above conditions are not satisfied and as a result, the flip flop does not provide a high output pulse to the AND gate 36. However, in the case of an ECG signal containing a normal QRS complex, the above conditions are satisfied and an output signal comparable to that shown in the left-hand example on line K is developed and is coupled to the AND gate 36 of the digital comparator 34.

AND gate 36 is of conventional design to block the passages of all pulses unless there is a positive pulse simultaneously present on both inputs to the AND gate. As a result, it may be seen that a positive signal "S" from the computer and display section 14 in and of itself will not pass through the gate 36 and, in addition, the positive pulse from detector 32 in and of itself will not pass through the gate 36. However, in the event that a positive pulse from detector 32 occurs during the interval when the positive enabling signal "S" is present, an output signal such as shown in the left-hand example on line K of FIG. 4 is provided from AND gate 36. The K signal is coupled to the timing and sequencing circuitry 13 to provide an indication of the presence of an ECG signal containing a normal QRS complex with the initiation of the pulse in the K signal timed to coincide with the termination of the R wave. The pulse in the K signal may also be used to control an aural or visual annunciator or other external equipment to indicate the detection of a normal width QRS complex.

The timing and sequencing circuit 13 may comprise six monostable multivibrators, 46, 48, 50, 52, 54 and 56 in series as shown on FIG. 5. Multivibrators 46, 50 and 54 are conventional multivibrators wherein a pulse of a predetermined length is produced in response to the leading edge of an incoming logic pulse. Multivibrators 48, 52 and 56 are conventional multivibrators wherein a short duration pulse is produced in response to the trailing edge of an incoming pulse. The K signal as developed in the QRS computer and display section 12 is coupled to the multivibrator 46 to produce an output pulse signal, as shown in line L of FIG. 6. The output of multivibrator 46 is connected to multivibrator 48 to provide an output signal as shown in line M of FIG. 6, which signal is coupled to the S-T segment computer and display section 14 and also to multivibrator 50. This sequence of multivibrators is repeated two additional times so that signals from multivibrators 52 and 56 are also coupled to section 14. The output signals from the multivibrators 48, 52 to 56 are shown on lines M, O, and Q of FIG. 6. In this manner, timing signals at three points in the S-T segment portion of each ECG complex which does not contain a wide R wave are introduced into the S-T segment computer and display section 14.

The duration of the S-T segment in the ECG complex varies with individuals and, specifically, the duration of the S-T segment varies depending upon the heart rate and physiological work load. In the embodiment of the invention described in the present application, the sampling of the S-T segment occurs at three points fixed in time after the termination of the R wave in each ECG complex. Specifically, the sampling occurs at points M, O, and Q as shown in the examples on line AA of FIG. 11. Because of patient-to-patient variations in the characteristics of the QRS complex, the samplings do not necessarily occur in the same portion of the S-T segment. Since the exact location of the sampling points in the S-T segment may be of interest to the attending physician, the present invention includes the capability of generating an output signal to provide a visual record as to where the samplings occurred in each ECG complex.

The output signal representing the sampling points is provided by the output signal from an OR gate 57 having inputs of M, O, and Q signals shown in FIG. 6. This gate 57 is a conventional gate wherein the output signal goes high and remains high so long as a high potential is present to any of its three inputs. The output signal of gate 57 resulting from the input of the M, O, and Q signals is shown on line MOQ of FIG. 6. The MOQ signal when connected to an external device such as a conventional oscilloscope or electrocardiograph marks in the trace of the displayed ECG complex the exact points at which the samples are being taken.

Figure 9:
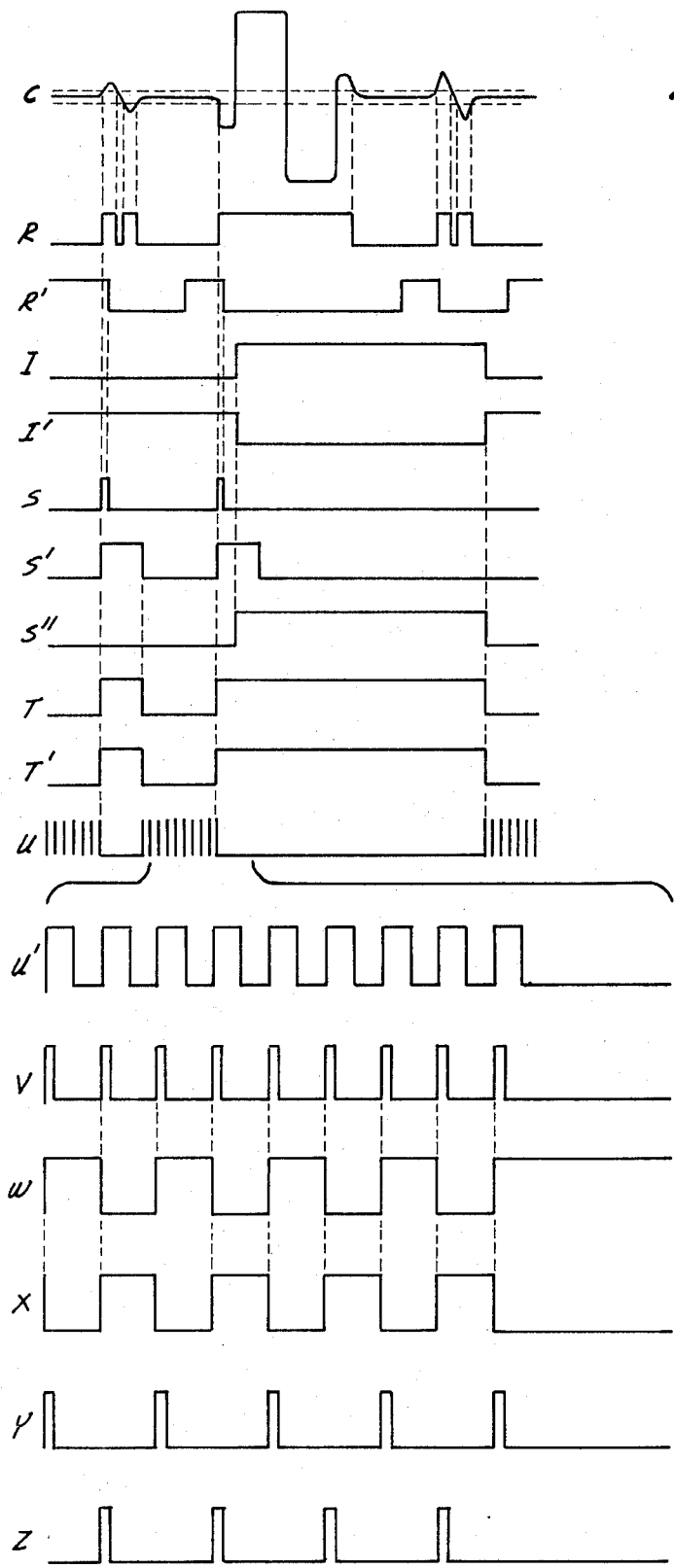
FIG. 9 is a series of waveforms present in various portions of the block diagram of FIG. 8.

The S-T segment computer and display section 14 determines the presence of elevated or depressed S-T segments in the processed ECG signals, as well as the slope, shape and time integral of the S-T segment. Section 14 includes circuitry to digitally display the level characteristics of the S-T segment. In addition, section 14 includes circuitry to digitally display the slope and time integral of the S-T segment and to indicate the shape of the S-T segment. Section 14 includes analog p-q sampling circuitry 57, differential amplifier 88, analog level, slope, shape, and integral circuitry 90, and S-T segment data display section 108 and is shown in block form in FIG. 7. One input to the analog p-q sampling circuitry, shown in more detail in FIG. 8, is the output of the differentiator 20 of FIG. 1. The output of the differentiator 20 is the waveform shown on line C of FIGS. 1 and 9. The C signal is coupled to a noise level detector 58 which consists of two conventional voltage comparators, having positive and negative reference voltage levels. The output of the detector 58 will be low when the magnitude of the input signal falls between the reference voltage levels and is high when the magnitude of the input signal is either more positive than the positive reference voltage level or more negative than the negative reference voltage level. The output from the detector 58, resulting from the input signal such as shown on line C of FIG. 9 is a signal with a wave form as shown on line R of FIG. 9. Both the positive and the negative reference voltages are of identical magnitude, and represent the maximum level of extraneous signals which are acceptable in establishing the p-q iso-electric reference potential. The extraneous signals consist primarily of 60 Hertz interference, electrode dc potential variation artifacts, and patient muscle tension signals. The reference levels are dependent upon such design parameters as the system ECG signal amplification factor, and the exact design of noise filter 18 and differentiator 20.

A low signal level at the output of detector 58, signifies that the ac noise level of the incoming ECG is of sufficiently low level so as to provide an acceptable iso-electric p-q reference for computing the various S-T levels described herein. Conversely, a high signal level at the output of detector 58, represents unacceptably high signal levels. The output from the detector 58 is directly coupled to one input of AND gate 60, and indirectly, via rc delay, 59 and retriggerable monostable-multivibrator 61, to the second input of gate 60.

AND gate 60 is of a conventional design to block the passage of positive pulses until simultaneous positive pulses are present at all three inputs.

RC delay 59 provides a time delay such that a change in the output potential R of detector 58 does not occur at the input of a retriggerable multivibrator (RMV) 61 until a finite time (on the order of 1 micro-second to 1 milli-second, after it is presented to AND gate 60. RMV 61 can be of conventional design and operates such that, whenever signal R is in its high state (representing unacceptable ac signal levels), the output, $R^1$ of RMV 61 goes low and remains low until a fixed time, typically on the order of 30 milliseconds, after signal R returns to its low level. High frequency variations in signal R with half-periods of less than 30 milliseconds, would appear in signal $R^1$ as a single pulse starting with the first transition in signal R to a high level, and terminating 30 milliseconds after the last transition to a low level.

The third input to the gate 60 is the $I^1$ signal which is developed from the I signal generated in section 12 shown in FIG. 3. The pulse in the I signal is initiated by the increase in potential of the R wave in the ECG complex. The I signal provides a pulse of a preset duration to remain high until after the last sample point Q has been completed. The I signal is coupled to inverter 62 which has a high potential output when the input potential is low and a low potential output when the input potential is high. The output signal from the inverter 62 has a waveform such as shown on line $I^1$ of FIG. 9.

In the instance where the signal $I^1$ is high and the RMV 61 is not in a triggered state, that is, when $R^1$ is high, and signal R goes from a low to a high signal level, a momentary, high voltage pulse occurs at output S of gate 60. The pulse S has determined by RC delay 59, since after the delay period of 1 to 1,000 microseconds, the output of RMV 61 goes to a low level, and the three inputs to gate 60 are no longer simultaneously at high levels.

Monostable multivibrator 63 provides a positive voltage pulse at its output $S^1$, upon receipt of the momentary pulse S at its input. The time duration of the $S^1$ pulse is typically on the order of 25 milliseconds, and is sufficiently long that, in the event a normal QRS complex is detected subsequent to the series of events which resulted in the generation of an S pulse, the I and $S^1$ signals are simultaneously high for a portion of the $S^1$ pulse period.

Flip flop (F/F) 67 is a conventional bistable set-reset flip-flop wherein its output $S^{11}$ is low whenever its reset input, connected to this instance to signal I, is low, and changes to a high state only if signal I is high when its set input, in this instance, the $S^1$ signal, is high. Once set to its high state, output $S^{11}$ remains high until signal I returns to its low state.

Signal $S^{11}$ is applied to QRS Detection and Display Section 12, and to Gate 65.

Gate 65 is a conventional OR gate wherein its output signal T is a low level when both of its inputs are low, and is a high level whenever either of its inputs are high. The resultant output of gate 65 is as shown on line T of FIG. 9, and is fed to inverter 69. The inverter 69 is a conventional device which provides a high potential output when the input is low and a low potential output when the input is high.

The resultant output of inverter 69 is fed to a gated clock 64 and is a waveform such as shown on line $T^1$ of FIG. 9. The gated clock 64 is a conventional device wherein a fixed clock frequency is set at the desired p-q sampling rate (typically on the order of 10 to 15 milliseconds), and an output of positive pulses at this predetermined sampling rate is generated whenever the potential of the input signal is high. The resultant output of the gated clock 64 is a signal with the waveform shown on line U of FIG. 9. $U^1$ is the waveform of the U signal shown on an expanded time scale for clarity.

The U signal is fed to monostable multivibrator 66 which provides a positive output pulse of a preselected width each time a leading edge of a U pulse occurs. The waveform of the output signal from the multivibrator 66 is shown on line V of FIG. 9. Since the positive pulses in the V signal are ultimately used to trigger sampling switches, the duration of the positive pulses is selected to provide a sample of short duration at the beginning of each sample period in order to reduce the number of sample switches required to achieve an acceptable accuracy in the measurement of the iso-electric potential.

The output signal from multivibrator 66 is fed to flip flop 68 as well as to AND gate 70 and to AND gate 72.

Flip flop 68 is a conventional bistable flip flop providing two output signals with one having the inverse logic state of the other. Flip flop 68 changes logic state on the leading edge of the pulses in the V signal, thereby generating the two output signals W and X shown on lines W and X of FIG. 9. The W signal is coupled as inputs to AND gate 70 and switch 74 and is used as a control signal to close switch 74. Similarly, the X signal is coupled to AND gate 72 and to switch 76 and is used as a control signal to close switch 76.

The V signal from multivibrator 66 and the W signal from flip flop 68 are coupled to the gate 70 which is a conventional AND gate. A high output signal is provided from the AND gate 70 and when both inputs are high, an output signal with a waveform such as shown on line Y of FIG. 9 is provided from AND gate 70. Y signal is coupled to switch 78 and is used as a control signal to close the switch 78. The V signal and X signal are coupled to AND gate 72 to provide an output signal Z with a waveform as shown on line Z of FIG. 9. The output signal from AND gate 72 is used as a control signal to close the switch 80. As can be seen in FIG. 9, the Y and Z signals contain pulses at one-half the clock frequency of the V pulses and they also appear alternately in time at equally spaced intervals.

Switches 78 and 80 may be standard I.C. analog switches and each switch receives an input signal B which is the analog voltage output of the high frequency noise filter 18 of FIG. 1. The output of switch 78 is coupled across a capacitor 82 and the output of switch 80 is coupled across a capacitor 84. The switches 78 and 80 are closed when the control pulses are high, so that the potential of the iso-electric portion of the ECG complex is periodically sampled and stored in capacitors 82 and 84.

The output of capacitor 82 is coupled to switch 76 and the output of capacitor 84 is coupled to switch 74. The outputs of switches 76 and 74 are connected together and applied to an analog buffer 86. Switches 76 and 74 may be standard I.C. analog switches and are controlled in accordance with alternating control to provide an alternating transfer of data to analog buffer 86. The switching times of switches 76 and 74 are such that the two switches cannot be closed simultaneously which might cause loading errors between the capacitor voltages. Also, the switching arrangement assures that the sample applied to the buffer 86 will be at least one sample removed from the last sample taken. This is because the $q$ wave in an ECG complex causes cessation of the clock pulses in the U signal, and the trigger signals W and X to the switches 76 and 74 from the U signal are derived. This sampling arrangement generally provides an acceptable level of accuracy in the measurement of the isoelectric potential in the ECG complex. However, the two switch arrangement for the sampling and release of data is shown as an example only and additional switches may be added should greater accuracy in the measurement of the iso-electric potential be desired.

As a result of the previous discussions, it can be seen that the design of the analog P-Q sampling circuitry provides a means of determining whether an isoelectric p-q reference of acceptable quality exists, and if it doesn't, of preventing the various S-T data for that ECG complex from being computed. This greatly reduces the probability of measurement errors, and increases the quality of data. The inhibiting of the S-T computation is accomplished by realizing that the following sequence of events pertaining to the ECG input signal characteristics must occur as shown by the waveforms of FIG. 9;

a. Approximately the last 30 milliseconds of the P-Q interval, representing the iso-electric p-q reference, must be virtually free of 60 Hertz interference, electrode dc potential artifacts and excessive patient muscle tension signals.

b. The initiation of the $S^1$ signal is normally the detection of the Q-wave, or, in the absence of a Q-wave with sufficient magnitude, the base of the R-wave.

Extraneous noise at the end of the P-Q interval may cause the $S^1$ signal to initiate. Due to the requirement for the R-wave to be detected within 25 milliseconds, the stored sample (to be discussed later) still remains within the P-Q interval, which is normally greater than 40 milliseconds. Should the noise level occur earlier, the 25 milliseconds is exceeded and the S-T sampling sequences described earlier and illustrated in FIGS. 5 and 6 is not enabled.

Figure 10:
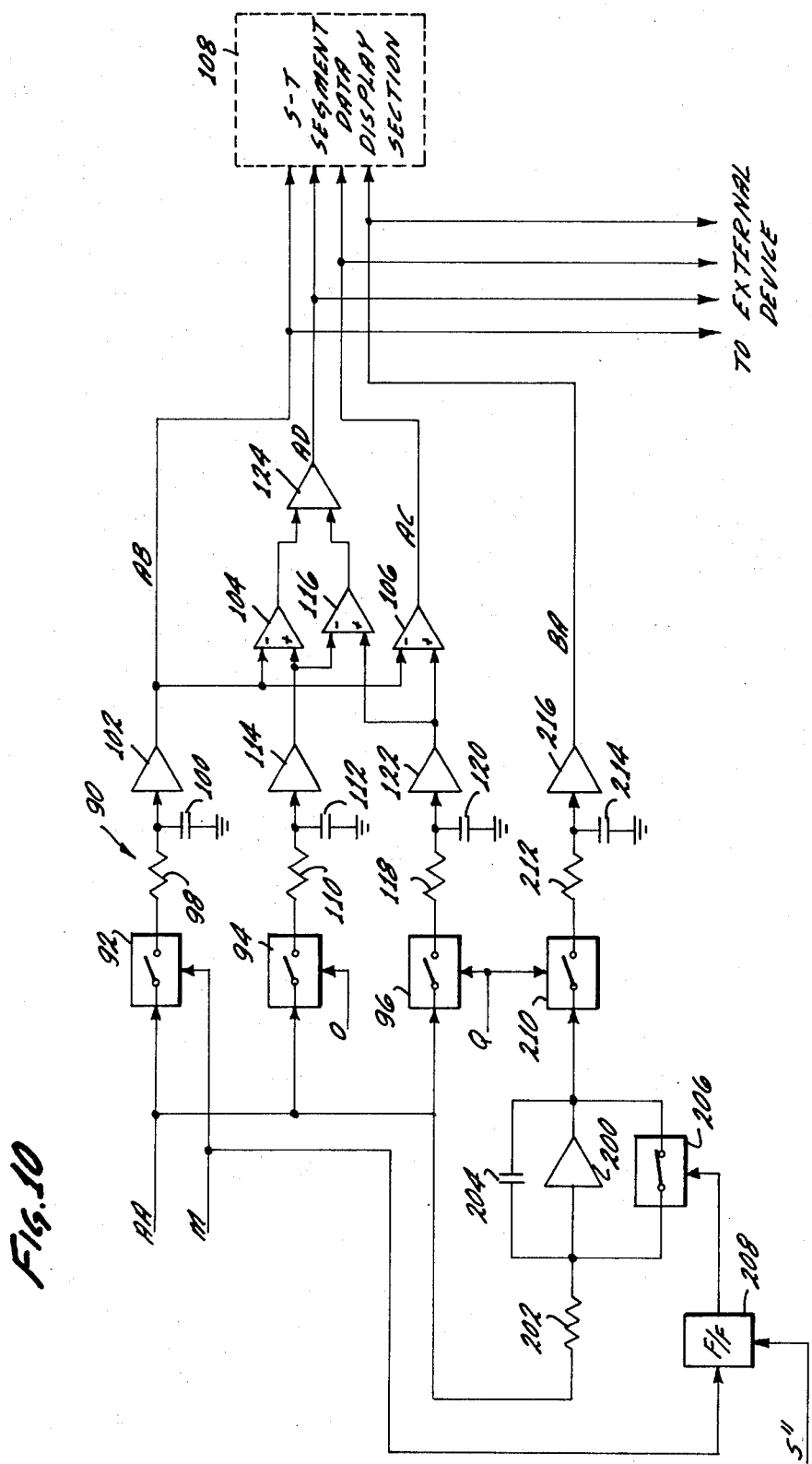
FIG. 10 is a functional diagram of the level, slope, shape and integral circuitry of the S-T segment computer and display section of the present invention.

Buffer 86 is a standard analog buffer which has a very high input impedance and very low input bias current so as to prevent loading errors of the p-q sampling capacitors 82 and 84. The output of buffer 86 is coupled to differential amplifier 88 which also receives as an input the B signal containing the ECG wave form as shown in line B of FIG. 2. Amplifier 88 is a conventional differential amplifier wherein the output signal contains the input waveform of the ECG complex offset by the voltage level of the potential in the DC bias signal from buffer 86. The waveform of signal AA is as shown on line AA of FIG. 11. For example, assuming a signal B, introduced into amplifier 88, wherein the p-q segment of the ECG complex has a potential as shown on line B of FIG. 11, and with this positive potential measured and applied as the other input to amplifier 88 from buffer 86, the differential amplifier 88 offsets the B waveform by this positive potential thereby producing the waveform as shown on line AA of FIG. 11 where the p-q section of the ECG complex has a zero potential. Amplifier 88 may also provide a gain to give the desired scaling of the analog outputs to thus simplify subsequent sample and hold circuits. The output signal AA from amplifier 88 is introduced to the analog level, slope, shape and integral computation circuitry 90 as shown in FIG. 10.

In the analog level, slope, shape, and integral computation circuitry 90, signal AA is coupled to switches 92, 94 and 96 and to integrator amplifier 200. Switches 92, 94 96 and 202 may be standard I.C. analog switches, as previously described, wherein the switch is closed by a positive pulse level in a digital control signal. Switch 92 closes for the duration of each M pulse shown in FIG. 6. Capacitor 100 is charged through resistor 98 and the combination of the values for the resistor 98 and capacitor 100 is chosen such that the voltage at the junction of the resistor 98 and the capacitor 100 is directly related to the exponential average of S-T potential level for a preselected number of heart beats at the M point in time as shown in the waveform AA in FIG. 11. The voltage across the capacitor 100 is coupled to buffer 102 which may be a standard analog buffer having a high input isolation to prevent loading of capacitor 100. The output of buffer 102 is provided as an input to differential amplifiers 104 and 106 as well as to S-T segment data display section 108. It should be recognized that the technique for averaging the analog data, as described here, may be adequate for many applications due to its simplicity, but other forms of averaging, such as time averaging, may be required for other applications.

Signal AA is coupled to switch 94 which is controlled by the pulse signal O. The output of switch 94 is coupled to an averaging circuit comprising resistor 110, capacitor 112, and buffer 114 which operate in a manner substantially identical to the averaging circuit described above. The S-T segment of ECG complex contained in the signal AA is sampled at that point in time corresponding to point O as shown on line AA of FIG. 11 and with the potential of this point being averaged over the same preselected number of heart beats. The sampled voltage provided across the capacitor 112 is coupled to buffer 114. the output of buffer 114 is coupled as the second input to differential amplifier 104 and also as an input to differential amplifier 116.

$$M_1 = \frac{X_O - X_M}{Y_O - Y_M} = \frac{V_O - V_M}{t_2 - t_1}$$

$$M_2 = \frac{X_Q - X_O}{Y_Q - Y_O} = \frac{V_Q - V_O}{t_3 - t_2}$$

A third sampling of the S-T segment in each ECG complex occurs at the point in time identified as point Q in the waveform shown on the line AA of FIG. 11. The third sampling is accomplished by introducing signal AA into switch 96 and using signal Q as a control signal for the switch. The output of switch 96 is connected to an averaging circuit comprising resistor 118, capacitor 120 and buffer 122 which averaging circuit is substantially identical to the previously described averaging circuits. The output of buffer 122 is coupled to the differential amplifiers 106 and 116.

The output signal AB from buffer 102, which represents the potential in the S-T segment of the ECG complex measured at point M, may be provided as an output to an external device and also may be coupled to the S-T segment data display section 108. The section 108 processes the analog signal AB to provide a digital indication of the depression or elevation in the S-T level at or just subsequent to the junction of the S and T waves, which is called the J point and is shown in line A of FIG. 11. The Potential at the M point is also introduced at the inverting input of differential amplifier 106. The output of buffer 122, which is the measure of potential of the S-T segment of the ECG complex at point Q, is connected at the non-inverting input to the amplifier 106. Amplifier 106 may be a conventional differential amplifier providing an output voltage AC representative of the difference in voltage between the two input signals. The output signal AC from amplifier 106, therefore, is a measure of the difference in potential points M and Q in the S-T segment of the ECG complex. The output signal AC may also be connected as an output to an external device as well as to the S-T segment data display section 108. The section 108 processes the analog signal AC to provide a digital indication of the slope between the two points, or rate of change of the S-T.

The general shape of the S-T segment may be measured by considering a minimum of three points within the segment. The slope of each line shown in the figure is:

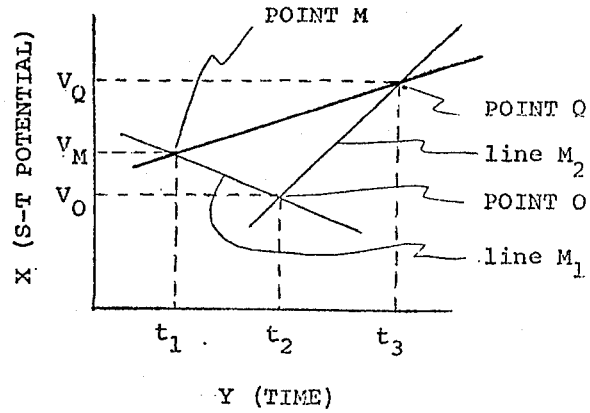

The shape of the segment may then be defined as the difference in the slopes of the two lines;

Shape $= C = M_2 - M_1 = (V_Q = V_O/t_3 - t_2) - (V_O - V_M/t_2 - t_1)$

Making the time intervals $t_3 - t_2$ and $t_2 - t_1$ identical and equal to one gives: $C = V_Q V_M - 2V_O$. Thus, when the two slopes are equal, $C = 0$; when point O is below the line intersecting points Q and M, the shape is positive, or concave; when point O is above the intersecting lines of points M and Q, the shape is negative, or convex. The shape of the S-T segment is of considerable significance to some investigators, particularly during exercise testing. For example, a subject's ECG complex is often thought to be pathological if the shape is convex, or possibly even zero, in he presence of an S-T level depression 2mm, or greater.

The inputs to the differential amplifier 104 are the potential of the S-T segment at point M at the inverting input and the potential of the S-T segment at point O at the non-inverting input. The output of amplifier 104 is the difference in voltage between that measured at point M and that at point O. The output of amplifier 104 is coupled to the inverting input of a conventional differential amplifier 124. The second input to amplifier 124 at the non-inverting input is a voltage representative of the difference in voltage between that measured at point O and at point Q. The second input is provided by the output signal from the conventional differential amplifier 116. The output signal AD from amplifier 124 is the difference in voltage between these two input signals and this signal AD is coupled to the S-T segment data display section 108. The section 108 processes the analog signal AD to provide an indication of the shape of the S-T segment as described above. In addition, the AD signal may be used as an input to an external device.

The present invention also processes the ECG signal by integrating the S-T segment voltage with respect to time. This is illustrated by the shaded portion of the waveform on line AA of FIG. 11. This integration technique may be used in conjunction with all or some of the data techniques described previously to further aid the physician in his diagnostic process.

Amplifier 200, resistor 202, and capacitor 204, all shown in FIG. 10, form the basic elements for a conventional integrating amplifier circuit which is capable of computing the time integral of the input analog voltage signal AA. Also included in the integrating circuit on analog switch 206, which is normally held closed by bistable flip flop 208. The switch 206, therefore, normally discharges the capacitor 204 which causes the output voltage of amplifier 200 to go to zero volts. The pulse signal M is applied to the input of flip flop 208, such that when the pulses in the M signal occur, the flip flop 208 is caused to change logic state to open the contacts of switch 206, and to allow the integration amplifier to begin computing the time integral of the input signal AA. Upon the occurrence of pulses in the signal Q, normally open switch 210 is closed for the duration of the pulse, and the voltage at the output of the integrating circuit is sampled and averaged using a resistor 212 and a capacitor 214 with an average time constant substantially identical to that used in processing signal AB. The voltage across capacitor 214 is coupled to the buffer amplifier 216, and the resultant signal, BA, is an analog voltage, proportional to the computed average of the integral of the S-T segment voltage computed between points M and Q. The BA signal is used as an input to the S-T segment data display section 108 and the section 108 processes the BA analog signal to provide a digital indication of the time integral of the S-T segment. As with the prior analog output signals developed in FIG. 10, the BA signal may also be provided as an input to some external device.

As stated above, the analog level, slope, shape and integral computation circuitry 90 may provide the four analog signals to an appropriate external device, such as a paper-writer. Since it is recognized that other modes of analysis may be desirable for other applications, these analog signals may be used with a conventional paperwriter or other appropriate device to provide permanent trend charts or other records.

Figure 13:
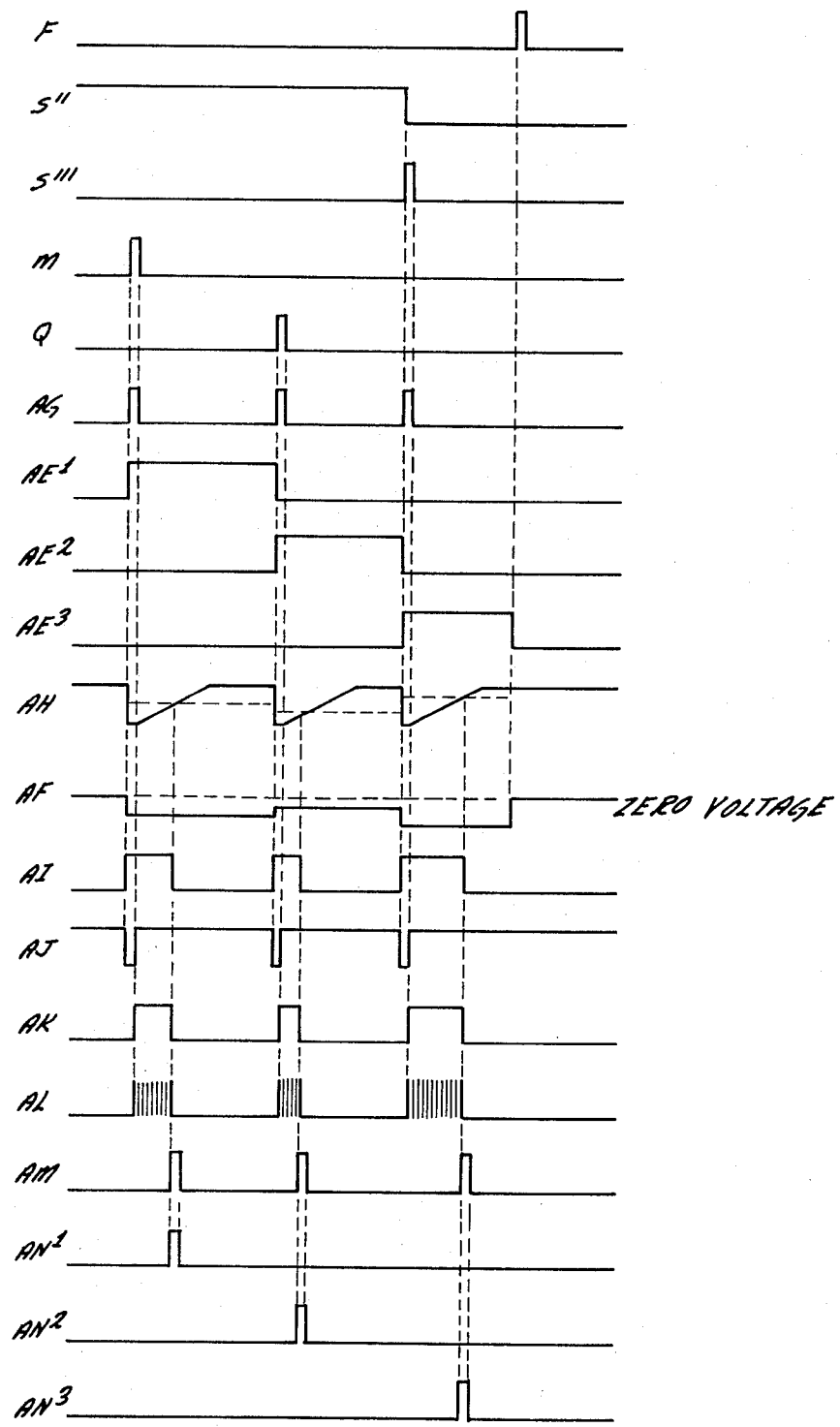
FIG. 13 is a series of waveforms present in the block diagram of FIG. 12.

The S-T segment data display section 108 is shown in FIG. 12 and receives the analog signals AB, AC, AD and BA. In addition, the section 108 receives input signal M,Q, F and $S^{11}$, the waveforms of which are shown in FIG. 13. The signal $S^{11}$ is coupled to monostable multivibrator 145, which develops a high output for a predetermined time interval in response to the trailing edge of the S-T sample enable signal, $S^{11}$. The output signal $S^{111}$ is shown in FIG. 13, and is coupled as one input to an OR gate 146. Other inputs to this OR gate are the M and Q signals previously developed in FIG. 5. The OR gate 146 passes all high potential pulses coupled as input signals. An output signal AG, having a waveform such as shown in FIG. 13, is developed from the OR gate 146. The output signal AG is coupled to decade counters 164 and 166 and is used to reset these counters. The AG signal is also connected to an inverter 148, a ramp generator 150, and a shift register 126.

Shift register 126 is a conventional device wherein a serial input is transformed to parallel outputs. When the register 126 is in a reset condition, all the output signals are low. Upon receipt of a first controlling pulse, the first position of the register develops a high output, with the other positions remaining low. A second controlling pulse causes the high output to be shifted to the second position. A third controlling pulse shifts the high output to the third position. Finally, a reset pulse will restore all register elements to a low condition. The introduction of the AG signal shown in FIG. 13 as the controlling signal results in parallel outputs with the waveforms as shown on lines $AE^1$, $AE^2$ and $AE^3$ in FIG. 13. The F signal, as shown in FIG. 13, resets the register. The first of the parallel outputs, signal $AE^1$, is used as a control signal for a switch 132 and is also coupled as one input to AND gate 136. The second of the parallel outputs, signal $AE^2$ is used as a control signal for a switch 134 and is also coupled as one input to AND gate 137. The last of the parallel outputs from the shift register, signal $AE^3$, is used as a control signal for a switch 135 and is coupled as one input to AND gate 139.

Switch 132 has as its input the AB signal which represents the elevation or depression in the S-T segment. Switch 134 has as its input the AC signal which represents the slope of the S-T segment and switch 135 has as its input the BA signal which represents the time integral of the S-T setment. The switches 132, 134, and 135 may be standard I.C. analog switches that close only when the potential of their control signal is high. In the arrangement of FIG. 12, no two switches can be closed simultaneously. The outputs of the switches 132, 134 and 135 are connected together to form output signal AF which includes in series, voltages representative of the S-T segment level, S-T segment slope and time integral of the S-T segment. The AF signal is coupled to comparators 138 and 140 as well as to analog inverter 142. The output from inverter 142 is connected to comparator 144.

The AG signal is coupled as an input to ramp generator 150 and the output of ramp generator 150 is used as a second input to the comparators 140 and 144. Ramp generator 150 may be a conventional device wherein its output signal goes low in response to an increase in an input signal goes low in response to an increase in an input signal and remains low for the duration of the pulse and then provides an analog output potential which increases linearly with time at a predetermined rate until saturation of the circuit occurs. Introduction of the AG signal to the ramp generator 150 results in an output signal AH having a waveform as shown in FIG. 13.

The AH signal is coupled to the positive voltage comparator 140 as the reference voltage input and the AH signal is also coupled to the negative voltage comparator 144 as the reference voltage input. Both comparators 140 and 144 may be conventional devices wherein the output from the comparator is high when the data input voltage exceeds the reference input voltage. The output from comparator 140 and the output from comparator 144 are coupled to OR gate 152 which may be a conventional device allowing passage of all high potential pulses contiained in either of the input signals. Since comparator 140 is set for a comparison of positive voltages and comparator 144 is set for a comparison of negative voltages, it can be seen that high outputs from the comparators do not occur simultaneously.

The results of an ECG complex such as shown in the first example of line A in FIG. 11 are reviewed in the following explanation. Processing the ECG complex provides a signal with the waveform as shown in the first example on line AA of FIG. 11. The AA signal is used as an input to the analog level, slope, shape and time integral computation circuitry 90 of the S-T segment computer and display section 14. Processing of the AA signal through circuitry 90 in turn results in four analog input signals to the S-T segment data and display section 108. These four input signals are the AB signal, which is an analog voltage representative of the S-T segment level, the AC signal, which is an analog voltage representative of the S-T segment slope, the AD signal, which is an analog voltage representative of the S-T shape, and the BA signal, which is an analog voltage representative of the time integral of the S-T segment. The switches 132, 134 and 135 provide the AF signal which contains in series, analog voltages representing the S-T segment level, S-T segment slope and time integral of the S-T segment. The AF analog signal resulting from the processing of the exemplary ECG complex is shown on line AF in FIG. 13. As shown in the example of FIG. 13, the level voltage, the slope voltage and the time integral voltage are all negative and, as a result, none exceed the positive voltage reference of comparator 140 and the output of the comparator 140 remains low. However, comparator 144 compares an inverted AF signal to the AH reference voltage and since the voltage of this inverted signal does exceed the reference voltage in the three instances, the resultant output of comparator 144 is a waveform such as shown in line AI of FIG. 13. If all the analog voltages contained in the AF signal had been high, the output of comparator 140 would contain appropriate pulse information while the output of comparator 144 would remain low.

The AI signal passes through OR gate 152 unchanged so that the AI signal shown in FIG. 13 becomes one input to AND gate 154. The other input to AND gate 154 is an inverted AG signal from inverter 148 which is the AJ signal as shown in FIG. 13. Gate 154 may be a conventional AND gate wherein a high output is developed only when both inputs are high. The output signal from the AND gate 154 is the signal AK shown in FIG. 13. The AK signal in the particular illustration contains three positive pulses, the duration of each being the duration of the corresponding pulse in the AI signal less the duration of the positive pulse in AG signal. Since the average voltages in the AF signal are updated during the positive pulses in the AG signal and since the termination of the AG signal initiates the ramp in the reference signal AH, the duration of the first pulse in AK signal is proportional to the voltage in the AF signal representing the average S-T segment level, the duration of the second pulse in the AK signal is proportional to the voltage in the AF signal representing the average S-T segment slope, and the duration of the third pulse in the AK signal is proportional to the AF signal representing the average time integral of the S-T segment.

The output of gate 154, or the AK signal, is coupled to a clock 156 and a monostable multivibrator 158. Multivibrator 158 may be a conventional device wherein a positive pulse of a predetermined duration is developed in response to the trailing edge of positive input pulses. The output signal from multivibrator is as shown by waveform AM of FIG. 13. The AM signal is used as an input to AND gates 136, 137, and 139 each of which is a conventional gate developing a high output when both inputs are high.

The two inputs to AND gate 136 are the AE$^1$ signal which is high only when the pulse associated with S-T segment level is present in the AK signal and the AM signal which contains a pulse generated at the conclusion of the S-T segment level pulse. The output signal AN$^1$, as shown in FIG. 13, contains a pulse initiated at the conclusion of the measurement of the level of the S-T segment. This signal AN$^1$ is connected to a storage unit 128 and to a storage unit 130 and is used as a control signal to transfer S-T segment level digital information from pulse counters 164 and 166 into storage unit 128.

The two inputs to AND gate 137 are the AE$^2$ signal and the AM signal which provides an output signal AN$^2$, having a pulse at the conclusion of the measurement of the slope of the S-T segment. The AN$^2$ signal is connected to storage units 160 and 162 and is used as a control signal to transfer S-T segment slope digital information from pulse counters 164 and 166 into storage unit 160.

The AND gate 139 receives the AE$^3$ and AM signals as inputs and provides a pulse output signal AN$^3$ at the conclusion of the measurement of the time integral of the S-T segment. The output of gate 139 is connected to storage units 141 and 143 and is used to transfer S-T segment time integral digital information from counters 164 and 166 into storage unit 141.

The output of gate 154, or the AK signal, is coupled to clock 156. Clock 156 may be any conventional gated clock, wherein positive pulses of a predetermined and fixed frequency are generated whenever the incoming signal is high. The output of clock 156 is the AL signal having the waveform as shown in FIG. 13. By a proper choice of the clock frequency, the first series of pulses in the AL signal is a direct measure of the level of the S-T segment in millimeters, the second series of pulses is a direct measure of the slope of the S-T segment in millimeters per second, and the third series of pulses is a direct measure of the time integral of the S-T segment in millimeters - seconds.

The output of the clock 156 is coupled to a conventional units counter 164 wherein the input pulses are counted and converted to a binary-coded-decimal (BCD) logic format. The counter 164 is used to establish a value to be displayed in the units column and with an output coupled to a decade counter 166 to accumulate data to be displayed in the tens column. The BCD data for the units and tens is stored in one of the storage units 128, 160, or 141.

Each of the storage units is a conventional unit used for the temporary storage of data. Since the trigger signal AN$^1$ applied to storage unit 128 occurs after the first series of positive pulses in the AL signal but before the second series of positive pulses, the measured level of the S-T segment is introduced into storage unit 128. In the same manner, the trigger signal AN$^2$ applied to storage unit 160 occurs after the second series of positive pulses in the AL signal but before the third series of positive pulses so that the measured slope of the S-T segment is introduced into storage unit 160. Finally, the trigger signal AN$^3$ applied to storage unit 141 occurs after the third series of pulses in the AL signal but before the first series of positive pulses generated from the next processed ECG complex, so that the measured time integral of the S-T segment is introduced into storage unit 141.

Upon receipt of the AN$^1$ trigger pulse at storage unit 128, the data previously stored is also presented to decoder 168. The decoder is a conventional device wherein the BCD data is converted to an appropriate logic code so that a display unit 170, shown in FIGS. 12 and 14, displays numerical digits representing the number of pulse counts accumulated in the decade counters 164 and 166. The display unit 170, therefore, displays the averaged level of the S-T segment of the ECG complex in units and tenths of millimeters. In the same manner, the data previously stored in storage unit 160 is also presented to decoder 172. The data representing the averaged S-T segment slope is displayed on display unit 174 in units and tenths of millimeters per second. Finally, the data previously stored in storage unit 141 is also presented to decoder 145. The data representing the averaged time integral of the S-T segment is displayed on display unit 147 in tenths and hundredths of millimetr seconds.

In order to display the polarities of the level, slope and integral of the S-T segment, comparator 138 is included in the circuitry of the S-T segment data display section 108. The comparator 138 is included as the deviation in the level may be either elevation or depression, the slope may be zero, positive, or negative and the integral may be either positive or negative. The comparator 138 provides a high output pulse when the input data voltage exceeds the input reference voltage. The output from comparator 138 is coupled as a data input to storage units 130, 162 and 143. The data input to comparator 138 is the analog signal AF, and this data is coupled to the inverting input of the comparator. The noninverting input is connected to ground to insure a zero voltage input. In the present example, which is the AF signal as shown in FIG. 13, the comparator 138 has a high output since a negative voltage is coupled to the inverting input throughout the period of the AF signal. A high output from comparator 138 is indicative of a depression in the S-T segment level, a negative slope for the S-T segment, or a negative integral for the S-T segment in accordance with the point in time that the output from the comparator is high. Storage unit 130 is a conventional unit wherein data is stored upon receipt of a high trigger pulse $AN^1$. In the particular example, a positive voltage is stored, which storage occurs in time just after the measurement of the level of the S-T segment. The stored data is then presented to display unit 176 shown in FIGS. 12 and 14 and a "minus" sign is displayed to indicate a depression in the S-T segment.

The output signal of comparator 138 is also coupled as a data input to storage unit 162 which is similar to storage unit 130. The trigger signal, $AN^2$, for the storage unit 162 occurs at the completion of the measurement of the slope of the S-T segment and, in our particular illustrated example, a high output from comparator 138 is introduced to the storage unit 162. This results in the display of a "minus" sign in display unit 178 to indicate a negative slope for the S-T segment.

In a similar manner, the output signal of comparator 138 is also applied as a data input to a storage unit 143, which receives a trigger signal $AN^3$. The triggering pulse in the $AN^3$ signal for our example occurs at a time when the output from comparator 138 is high so that a high voltage potential is introduced to storage unit 143. This results in the display of a minus sign in the display unit 149 to indicate a negative integral for the S-T segment.

If the voltage of the AF signal is positive at the time of the pulse in the $AN^1$ signal, the output of comparator 138 is low because the AF signal is coupled to the inverting input and does not exceed the zero reference voltage. This low input signal is stored in unit 130 and then transferred to display unit 176 to display a plus sign to indicate an elevation of the S-T segment. Following the same process, a "plus" sign indicative of a positive slope for the S-T segment is displayed in display unit 178 when the voltage of the AF signal is positive at the time of the pulse in trigger signal $AN^2$. A "plus" sign, indicative of a positive integral for the S-T segment is displayed in display 149 when the voltage of the AF signal is positive at the time of the pulse in trigger signal $AN^3$.

The AD signal developed in the analog level, slope, shape and integral computation of circuitry 90 is indicative of the shape of the S-T segment. The following is a review of what transpires in a portion of circuitry 90 when an ECG complex such as that shown on the first example of line A in FIG. 11 is processed. Assuming that the preceding ECG complexes had somewhat the same waveform as that shown on line A, the averaged voltages in the outputs of buffers 102, 114 and 122 would be as shown at points M, O, and Q in the first example shown on line AA of FIG. 11. With the slightly negative voltage measured at point M applied to the inverting input of amplifier 104, shown in FIG. 10, and with the more negative voltage at point O applied to the non-inverting input of amplifier 104, the output of differential amplifier 104 will be a negative voltage having a magnitude equal to the difference in the voltages measured at points M and O. Similarly, the output of differential amplifier 116 will be a positive voltage with the magnitude equal to the difference in voltages measured at points O and Q which, in our particular example, is a magnitude less than the magnitude of the output from amplifier 104. The negative voltage output of amplifier 104 is connected to the inverting input of amplifier 124 and the positive voltage output from amplifier 116 is connected to the non-inverting input of amplifier 124 so that the resultant output AD of amplifier 124 contains a positive voltage equal to the difference between the two input voltages.

The AD signal is fed to the S-T segment data display section 108 wherein it is coupled to comparators 180 and 182. Comparator 180 has a small positive reference voltage and may be a conventional comparator wherein the output goes negative whenever the input voltage exceeds the reference voltage. Comparator 182 has a small negative reference voltage and may be a conventional comparator wherein the output goes negative when the input voltage is more negative than the reference voltage. The output of comparator 180 is coupled to one terminal of lamp 184 and the other terminal of lamp 184 receives a constant positive voltage. Likewise, the output of comparator 182 is coupled to lamp 186 and the other terminal of lamp 186 receives a constant positive voltage.

When the constant voltage applied to each lamp is approximately equal to the potential of a high output from comparators 180 and 182, no current will flow through either lamp and consequently the lamp is not illuminated. However, when a comparator output is negative, a current flows through the connected lamp due to the difference in potential and this particular lamp is illuminated.

It can be seen that when the incoming AD signal consists of a positive voltage sufficient to exceed the reference voltage of comparator 180, the lamp 184 shown in FIGS. 12 and 14 is illuminated to indicate a concave shape to the S-T segment in the processed ECG complexes. Conversely, a sufficient negative voltage in the incoming AD signal results in the illumination of lamp 186 to indicate the presence of S-T segments with a convex shape in the ECG complexes. With the present arrangement of comparators, it is possible to have both lamps illuminated simultaneously and in the case where the voltage of the AD signal neither exceeds the reference voltage of comparator 180 nor is more negative than the reference voltage of comparator 182, both lamps remain unilluminated. This indicates that the shape of the S-T segment approximates a straight line. If the computing of the characteristics of the S-T segment are inhibited as explained above, it would be desirable to provide a visual indication of such rejection and a lamp 187 may be illuminated for such purpose.

Although the invention has been shown with reference to a particular embodiment, it is to be appreciated that various adaptations and modifications may be made and the invention is only to be limited by the appended claims.

I claim:

1. An ECG computer for processing ECG complexes each having at least an iso-electric portion, a QRS section, and an S-T segment, including:
   first means responsive to the ECG complexes for providing output signals representing the detection of wide or normal QRS sections,
   second means coupled to the first means and responsive to the detection of wide QRS sections to provide an output indication of the wide QRS sections,
   third means coupled to the first means and responsive to the detection of normal QRS sections to provide a control signal representing the detection of normal QRS sections,
   fourth means coupled to the third means and responsive to the control signal and the ECG complexes to analyze the S-T segments by averaging over a plurality of the ECG complexes and with the analysis in response to the control signal representing the detection of normal QRS sections.

2. The ECG computer of claim 1, wherein the first means includes further means to provide a digital signal representing the wide QRS sections.

3. The ECG computer of claim 1, wherein the first means detects wide QRS sections using at least one voltage comparator to determine the length of time the potential of the QRS section is greater than a reference voltage.

4. The ECG computer of claim 3, wherein the ECG complexes are converted into rate-of-change signals and wherein the first means includes a pair of voltage comparators to determine the length of time the potential of the QRS section is greater than the reference voltages of either of the pair of voltage comparators.

5. The ECG computer of claim 1, wherein the fourth means includes means to inhibit the analysis of the S-T segment when the iso-electric portion includes variations in potential greater than a predetermined level.

6. The ECG computer of claim 1, wherein the fourth means includes means to compute the level of the S-T segment.

7. The ECG computer of claim 1, wherein the fourth means includes means to compute the level of the S-T segment and the elevation or depression of the S-T segment relative to the iso-electric portion of the ECG complex.

8. The ECG computer of claim 1, wherein the fourth means includes means to compute the slope of the S-T segment.

9. The ECG computer of claim 1, wherein the fourth means includes means to compute the slope of the S-T segment and to compute the direction of the slope.

10. The ECG computer of claim 1, wherein the fourth means includes means to compute the shape of the S-T segment.

11. The ECG computer of claim 1, wherein the fourth means includes means to compute the integral of the S-T segment.

12. The ECG computer of claim 1, wherein the fourth means includes means to compute the level, slope, shape and integral of the S-T segment.

13. The ECG computer of claim 1, wherein the fourth means includes means for sampling the S-T segment at a plurality of points.

14. The ECG computer of claim 13, additionally including fifth means for displaying the ECG complex and including displaying the sample points within the complex.

15. An ECG computer for processing ECG complexes having at least an iso-electric portion, a QRS section, and an S-T segment, including:
   first means responsive to the ECG complexes for providing output signals representing the detection of wide QRS sections wherein the first means includes means to detect wide QRS sections using at least one voltage comparator to determine the length of time the potential of the QRS section is greater than a reference voltage in the ECG complexes,
   second means coupled to the first means and responsive to the detection of wide QRS sections to provide an output indication of the wide QRS sections, and
   third means coupled to the ECG complexes to compute the leve, slope, shape and integral of the S-T segment and with the third means including means responsive to the detection of wide QRS sections to inhibit the analysis of the S-T segment upon such detection.

16. The ECG computer of claim 15, wherein the first means includes further means to provide a digital signal representing the wide QRS sections.

17. The ECG computer of claim 15, wherein the ECG complexes are converted into rate-of-change signals and wherein the first means includes a pair of voltage comparators to determine the length of time the potential of the QRS section is greater than the reference voltages of either of the pair of voltage comparators.

18. The ECG computer of claim 5, wherein the third means further includes means to inhibit the analysis of the S-T segment when the iso-electric portion includes variations in potential greater than a predetermined level.

19. The ECG computer of claim 5 wherein the third means includes means for sampling the S-T segment at a plurality of points.

20. The ECG computer of claim 19 additionally including fourth means for displaying the ECG complex and including displaying the sample points within the complex.

21. An ECG computer for processing ECG complexes each having at least an iso-electric portion, a QRS section, and an S-T segment, including:
  first means responsive to the iso-electric portion of the ECG complexes for normalizing the ECG complexes to provide the iso-electric portions at zero potential,
  second means responsive to the normalized ECG complexes to sample the S-T segment of the normalized ECG complexes at a plurality of points to provide a plurality of sample signals for each ECG complex, and
  third means coupled to the second means and responsive to the sample signals to analyze the S-T segments in accordance with the sample signals by averaging over a plurality of ECG complexes.

22. The ECG computer of claim 21 wherein the third means includes means to inhibit the analysis of the S-T segment when the iso-electric portion includes variations in potential greater than a predetermined level.

23. The ECG computer of claim 21 additionally including means for detecting wide or normal QRS sections and for controlling the analyzing of S-T segments of the ECG complexes with only normal QRS sections.

24. The ECG computer of claim 21 wherein the third means includes means to compute the level of the S-T segment.

25. The ECG computer of claim 21 wherein the third means includes means to compute the level of the S-T segment and the elevation or depression of the S-T segment relative to the iso-electric portion of the ECG complex.

26. The ECG computer of claim 21 wherein the third means includes means to compute the slope of the S-T segment.

27. The ECG computer of claim 21 wherein the third means includes means to compute the slope of the S-T segment ad to compute the direction of the slope.

28. The ECG computer of claim 21 wherein the third means includes means to compute the shape of the S-T segment.

29. The ECG computer of claim 21 wherein the third means includes means to compute the integral of the S-T segment.

30. The ECG computer of claim 21 wherein the third means includes means to compute the level, slope, shape and integral of the S-T segment.

31. The ECG computer of claim 21 additionally including fourth means coupled to the third means to display the analysis of the S-T segment.

32. The ECG computer of claim 21 additionally including fourth means for displaying the ECG complex and including displaying the sample points within the complex.

* * * * *